US011250151B2

(12) United States Patent
Yeo et al.

(10) Patent No.: US 11,250,151 B2
(45) Date of Patent: Feb. 15, 2022

(54) ENCRYPTED SEARCH OVER ENCRYPTED DATA WITH REDUCED VOLUME LEAKAGE

(71) Applicant: Google LLC, Mountain View, CA (US)

(72) Inventors: Kevin Yeo, Mountain View, CA (US); Joon Young Seo, Mountain View, CA (US); Giuseppe Persiano, New York, NY (US); Sarvar Patel, Montville, NJ (US)

(73) Assignee: Google LLC, Mountain View, CA (US)

( * ) Notice: Subject to any disclaimer, the term of this patent is extended or adjusted under 35 U.S.C. 154(b) by 93 days.

(21) Appl. No.: 16/867,342

(22) Filed: May 5, 2020

(65) Prior Publication Data

US 2021/0350014 A1    Nov. 11, 2021

(51) Int. Cl.
*G06F 7/04* (2006.01)
*G06F 21/62* (2013.01)
(Continued)

(52) U.S. Cl.
CPC ........ *G06F 21/6218* (2013.01); *G06F 16/144* (2019.01); *G06F 16/156* (2019.01);
(Continued)

(58) Field of Classification Search
CPC .. G06F 21/6218; G06F 16/144; G06F 16/182; G06F 16/156; G06F 21/602; H04L 9/0662
See application file for complete search history.

(56) References Cited

U.S. PATENT DOCUMENTS 8,510,846 B1 *   8/2013   Gunnarson ............. G06F 21/80
                                                                        726/26
9,111,106 B2 *   8/2015   Matsuda ................. G06F 21/62
                     (Continued)

OTHER PUBLICATIONS

Ahsan et al., "Countering Statistical Attacks in Cloud-Based Searchable Encryption," International Journal of Parallel Programming, Plenum Press, New York, US, vol. 48, No. 3, Jun. 30, 2018 (Jun. 30, 2018), 26 pages.
(Continued)

*Primary Examiner* — Gary S Gracia
(74) *Attorney, Agent, or Firm* — Honigman LLP; Brett A. Krueger

(57) ABSTRACT

A method for performing encrypted search includes receiving a search query for a plurality of keywords from a user device that appear in one or more encrypted documents stored on an untrusted storage device. The method also includes accessing an encrypted search index to obtain a first list of document identifiers each representative of a document that includes a first keyword and a second keyword of the plurality of keywords. The method also includes, for each remaining keyword, determining a corresponding list of document identifiers each representative of a document that includes the first, second, and respective remaining keyword. The method includes determining, based on the first list of document identifiers and each corresponding list of document identifiers, a second list of document identifiers each representative of a document that includes each of the plurality of keywords. The method also includes returning the second list to the user device.

20 Claims, 15 Drawing Sheets

(51) Int. Cl.
*G06F 21/60* (2013.01)
*G06F 16/182* (2019.01)
*G06F 16/14* (2019.01)
*H04L 9/06* (2006.01)
*H04N 7/16* (2011.01)

(52) U.S. Cl.
CPC .......... *G06F 16/182* (2019.01); *G06F 21/602* (2013.01); *H04L 9/0662* (2013.01)

(56) References Cited

U.S. PATENT DOCUMENTS

| | | | | |
|---|---|---|---|---|
| 9,298,808 | B2* | 3/2016 | Sundaram | G06F 16/31 |
| 9,342,705 | B1* | 5/2016 | Schneider | H04L 9/0822 |
| 9,633,219 | B2* | 4/2017 | Baessler | G06F 21/6227 |
| 9,679,160 | B1* | 6/2017 | Zhang | G06F 21/602 |
| 9,715,546 | B1* | 7/2017 | Mohassel | G06F 16/951 |
| 9,977,918 | B2* | 5/2018 | Fan | G06F 21/6227 |
| 10,037,435 | B2* | 7/2018 | Baessler | H04L 9/14 |
| 10,127,391 | B1* | 11/2018 | Whitmer | G06F 16/2455 |
| 10,140,370 | B1* | 11/2018 | Zhang | G06F 21/6272 |
| 10,402,109 | B2* | 9/2019 | Yu | G06F 3/067 |
| 10,586,058 | B2* | 3/2020 | Whitmer | G06F 21/602 |
| 2013/0287210 | A1* | 10/2013 | Matsuda | G06F 21/62 380/44 |
| 2014/0351260 | A1* | 11/2014 | Sundaram | G06F 21/00 707/741 |
| 2015/0356314 | A1* | 12/2015 | Kumar | G06F 16/2228 713/165 |
| 2017/0026350 | A1* | 1/2017 | Dawoud | H04L 9/0637 |
| 2017/0060940 | A1* | 3/2017 | Baessler | G06F 16/3331 |
| 2017/0061151 | A1* | 3/2017 | Baessler | H04L 9/14 |
| 2017/0068477 | A1* | 3/2017 | Yu | G06F 3/0659 |
| 2017/0091475 | A1* | 3/2017 | Fan | G09C 1/00 |
| 2017/0139985 | A1* | 5/2017 | Hahn | G06F 16/9535 |
| 2017/0300713 | A1* | 10/2017 | Fan | H04L 63/0435 |
| 2019/0042767 | A1* | 2/2019 | Whitmer | G06F 16/2228 |
| 2019/0340381 | A1* | 11/2019 | Yavuz | H04L 9/00 |
| 2020/0125563 | A1* | 4/2020 | Fan | H04L 9/088 |
| 2021/0182261 | A1* | 6/2021 | Yeo | H04L 9/0894 |
| 2021/0182408 | A1* | 6/2021 | Yeo | H04L 9/006 |
| 2021/0184840 | A1* | 6/2021 | Yeo | H04L 9/0869 |

OTHER PUBLICATIONS

Cao Qiang et al. "Privacy-preserving conjuctive keyword search on encrypted data with enhanced fine-grained access control," Mar. 4, 2019, 31 pages.
International Search Report, PCT/US2020/065174, dated Mar. 19, 2021, 18 pages.
Lai et al., "Result Pattern Hiding Searchable Encryption for Conjunctive Queries," Jan. 15, 2018, 18 pages.
Liu et al., "Multi-User Verifiable Searchable Symmetric Encryption for Cloud Storage," Oct. 18, 2018, 11 pages.

* cited by examiner

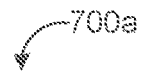

$(\mathsf{msk}, \mathsf{EMM}) \leftarrow \mathsf{Conj.Setup}(1^\lambda, \mathsf{MM} = \{k_i, \bar{v}_i\}_{i \in [m]})$:

1. Randomly select PRF keys $K^p, K^\tau, K^x \leftarrow \{0,1\}^\lambda$.
2. Random select encryption key $K^{enc} \leftarrow \{0,1\}^\lambda$.
3. Set $\mathsf{MM}^p \leftarrow \perp$.
4. For all pairs $(a,b)$ of keys appearing in MM:
   (a) Compute PRF key $K^\tau_a \leftarrow F(K^\tau, a)$.
   (b) Compute encryption key $K^{enc}_{a,b} \leftarrow F(K^p, a \| b)$.
   (c) Set $\mathsf{MM}^p[(a,b)] \leftarrow \emptyset$.
   (d) For all $v \in \mathsf{MM}[a] \cap \mathsf{MM}[b]$:
       i. Compute $\mathsf{tag}_{a,v} \leftarrow F(K^\tau_a, v)$.
       ii. Set $\mathsf{MM}^p[(a,b)] \leftarrow \mathsf{MM}^p[(a,b)] \cup \{(\mathsf{Enc}(K^{enc}_{a,b}, \mathsf{tag}_{a,v}), \mathsf{Enc}(K^{enc}, v))\}$.
5. Execute $(\mathsf{msk}^p, \mathsf{EMM}^p) \leftarrow \mathsf{sEMM.Setup}(1^\lambda, \mathsf{MM}^p)$.
6. Initialize $\mathcal{X} = \emptyset$.
7. For all pairs $(a,b)$ of keys appearing in MM:
   (a) Compute PRF key $K^x_{a,b} = F(K^x, a \| b)$.
   (b) For all $v \in \mathsf{MM}(a \wedge b)$:
       i. Set $\mathcal{X} \leftarrow \mathcal{X} \cup \{F(K^x_{a,b}, \mathsf{tag}_{a,v})\}$.
8. Randomly permute $\mathcal{X}$.
9. Return $(\mathsf{msk} = (K^p, K^x, K^{enc}, \mathsf{msk}^p), \mathsf{EMM} = (\mathsf{EMM}^p, \mathcal{X}))$.

FIG. 7A $tok_\phi \leftarrow \text{Conj.Token}(msk = (K^p, K^\alpha, K^{enc}, msk^p), \phi = (k_1 \wedge k_2 \wedge \ldots \wedge k_q))$:

1. Compute $tok^p \leftarrow \text{sEMM.Token}(msk^p, (k_1, k_2))$.
2. Compute $K^{enc}_{k_1, k_2} \leftarrow F(K, k_1 \| k_2)$.
3. For $j = 3, \ldots, q$:
   (a) Compute $K^\alpha_j = F(K^\alpha, k_1 \| k_j)$.
4. Return $tok_\phi = (tok^p, K^{enc}_{k_1, k_2}, K^\alpha_3, \ldots, K^\alpha_q)$.

FIG. 7B

ans ← Conj.Search(tok$_\phi$ = (tok$^p$, $K^{enc}_{q_1,x_2}$, $K^x_3$, ..., $K^x_q$), EMM = (EMM$^p$, $\mathcal{X}$)):
1. Retrieve $\{(etag_i, ev_i)\}_{i \in [\ell]}$ ← sEMM.Search(tok$^p$, EMM$^p$).
2. For $i = 1, ..., \ell$:
   (a) Compute tag$_i$ ← Dec($K^{enc}_{q_1,x_2}$, etag$_i$).
3. Set ans ← ∅.
4. For $i = 1, ..., \ell$:
   (a) For $j = 3, ..., q$:
       i. Compute dtag$_{i,j}$ ← $F(K^x_j, tag_i)$.
   (b) If for all $j = 3, ..., q$, it is the case that dtag$_{i,j}$ ∈ $\mathcal{X}$, then set ans ← ans ∪ $\{(ev_i)\}$.
5. Return ans.

FIG. 7C

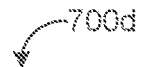

ans ← Conj.Resolve(ans = $(ev_1, ..., ev_r)$, msk = $(K^p, K^x, K^{enc}, msk^p)$):
1. Return $\{Dec(K^{enc}, ev_1), ..., Dec(K^{enc}, ev_r)\}$.

FIG. 7D $(\text{msk}, \text{EMM}) \leftarrow \text{CNF.Setup}(1^\lambda, \text{MM} = \{k_\ell, \vec{v}_\ell\}_{\ell \in [m]})$:

1. Randomly select PRF keys $K^p, K^\tau, K^\kappa \leftarrow \{0,1\}^\lambda$.
2. Random select encryption key $K^{\text{enc}} \leftarrow \{0,1\}^\lambda$.
3. Set $\text{MM}^p \leftarrow \perp$.
4. For all pairs $(a, b)$ of keys appearing in MM:
   (a) Compute PRF key $K_a^\tau \leftarrow F(K^\tau, a)$.
   (b) Compute encryption key $K_{a,b}^{\text{enc}} \leftarrow F(K^p, a \| b)$.
   (c) Set $\text{MM}^p[(a,b)] \leftarrow \emptyset$.
   (d) For all $v \in \text{MM}[a] \cap \text{MM}[b]$:
      i. Compute $\text{tag}_{a,v} \leftarrow F(K_a^\tau, v)$.
      ii. Set $\text{MM}^p[(a,b)] \leftarrow \text{MM}^p[(a,b)] \cup \{(\text{Enc}(K_{a,b}^{\text{enc}}, \text{tag}_{a,v}), \text{Enc}(K^{\text{enc}}, v))\}$.
5. Execute $(\text{msk}^p, \text{EMM}^p) \leftarrow \text{sEMM.Setup}(1^\lambda, \text{MM}^p)$.
6. Initialize $\mathcal{X} = \emptyset$.
7. For all pairs $(a, b)$ of keys appearing in MM:
   (a) Compute PRF key $K_{a,b}^\kappa = F(K^\kappa, a \| b)$.
   (b) For all $v \in \text{MM}(a \wedge b)$:
      i. Set $\mathcal{X} \leftarrow \mathcal{X} \cup \{F(K_{a,b}^\kappa, \text{tag}_{a,v})\}$.
8. Randomly permutes $\mathcal{X}$.
9. Return $(\text{msk} = (K^p, K^\kappa, K^{\text{enc}}, \text{msk}^p), \text{EMM} = (\text{EMM}^p, \mathcal{X}))$.

FIG. 8A $tok_\phi \leftarrow$ CNF.Token($msk = (K^p, K^x, K^{enc}, msk^p), \Phi = D_1 \wedge \ldots \wedge D_\ell$):

1. For $d = 1, \ldots, \ell$, parse $D_d$ as $(k_{d,1} \vee \ldots \vee k_{d,q_d})$.
2. For $i = 1, \ldots, q_1$:
   (a) For $j = 1, \ldots, q_2$:
      i. Compute $K_{i,j}^{enc} \leftarrow F(K, k_{1,i} \| k_{2,j})$.
      ii. Compute $tok_{i,j}^p \leftarrow$ sEMM.Token($msk^p, (k_{1,i}, k_{2,j})$).
3. For $i = 1, \ldots, q_1$:
   (a) For $r = i+1, \ldots, q_1$:
      i. Compute $K_{k_{1,i},k_{1,r}}^x = F(K^x, k_{1,i} \| k_{1,r})$.
4. For $d = 3, \ldots, \ell$:
   (a) For $i = 1, \ldots, q_1$:
      i. For $j = 1, \ldots, q_d$:
         A. Compute $K_{k_{1,i},k_{d,j}}^x = F(K^x, k_{1,i} \| k_{d,j})$.
5. Return $(((K_{i,j}^{enc}, tok_{i,j}^p))_{(i,j) \in [q_1] \times [q_2]}, \{K_{k_{1,i},k_{1,r}}^x\}_{i<r \in [q_1] \times [q_1]},$
   $\{K_{k_{1,i},k_{3,j}}^x\}_{(i,j) \in [q_1] \times [q_3]}, \ldots, \{K_{k_{1,i},k_{\ell,j}}^x\}_{(i,j) \in [q_1] \times [q_\ell]})$.

FIG. 8B $ans \leftarrow \text{CNF.Search}(tok_q, \text{EMM} = (\text{EMM}^p, \mathcal{Y}))$:

1. Parse $tok_q = (\{(K_{i,j}^{p\pi}, tok_{i,j}^x)\}_{i \in [\ell], j \in [q_i]}, \{K_{2,i,x_{2,i}}^x\}_{i \in [q_1] \times [q_2]},$
   $\{K_{3,i,x_{3,i}}^x\}_{i \in [q_1] \times [q_3]}, \ldots, \{K_{\ell,i,x_{\ell,i}}^x\}_{i \in [q_1] \times [q_\ell]})$.

2. For $i = 1, \ldots, q_1$:   # Compute partition of $D_1 \wedge D_2$ (a) Set $S_i \leftarrow \emptyset$.

(b) For $j = 1, \ldots, q_2$:

i. Set $S_i \leftarrow S_i \cup \text{sEMM.Search}(tok_{i,j}^x, \text{EMM}^p)$.

(c) Use decryption key $K_{1,i}^{p\pi}$ to decrypt the first component of every pair of $S_i$ and remove pairs from $S_i$ until all pairs have distinct first component.

(d) Parse $S_i$ as $\{(tag_1, ev_1), \ldots, (tag_{|S_i|}, ev_{|S_i|})\}$.

(e) For each $(tag, ev) \in S_i$:

i. Compute double tag $dtag_r \leftarrow P(K_{r,i,x_{r,i}}^x, tag)$, for $r = i+1, \ldots, q_1$.

ii. If one of the double tags belongs to $\mathcal{Y}$, then remove the pairs containing tag from $S_i$.

3. For $d = 3, \ldots, \ell$:   # Filtering using clause $D_d$ (a) For $i = 1, \ldots, q_1$:

i. For each $(tag, ev) \in S_i$:

A. Compute $dtag_j \leftarrow P(K_{d,i,x_{d,i}}^x, tag)$, for $j = 1, \ldots, q_d$.

B. If one of $dtag_1, \ldots, dtag_{q_d}$ belongs to $\mathcal{Y}$ then, set $S \leftarrow S \setminus \{(tag, ev)\}$.

4. Return all second components appearing in $S = S_1 \cup S_2 \cup \ldots \cup S_{q_1}$. That is, parse $S$ as $S = \{(tag_1, ev_1), \ldots, (tag_{|S|}, ev_{|S|})\}$ and return $ans = \{ev_1, \ldots, ev_{|S|}\}$.

FIG. 8C $ans \leftarrow \text{CNF.Resolve}(ans = \{ev_1, \ldots, ev_{|ans|}\}, msk = (K^p, K^x, K^{enc}, msk^p))$:

1. Return $\text{Dec}(K^{enc}, ev_1), \ldots, \text{Dec}(K^{enc}, ev_{|ans|})$.

FIG. 8D

ENCRYPTED SEARCH OVER ENCRYPTED DATA WITH REDUCED VOLUME LEAKAGE

TECHNICAL FIELD

This disclosure relates to performing encrypted searches over encrypted data with reduced volume leakage.

BACKGROUND

Searchable encryption (i.e., encrypted search) has increased in popularity as storage of large quantities of data in the cloud becomes more common. More and more, a user or client owns a large corpus of encrypted documents that are stored at a server not under the client's control (i.e., the server is untrusted). With searchable encryption, the client can store their encrypted documents on the untrusted server, but still maintain the capability of searching the documents and, for example, retrieve identifiers of all documents containing a specific keyword. However, such searchable encryption often comes with security and privacy drawbacks.

SUMMARY

One aspect of the disclosure provides a method for performing encrypted search over encrypted data with reduced volume leakage. The method includes receiving, at data processing hardware, a search query for a plurality of keywords from a user device associated with a user. The plurality of keywords appear in one or more encrypted documents within a corpus of encrypted documents stored on an untrusted storage device. The method also includes accessing, by the data processing hardware, an encrypted search index to obtain a first list of document identifiers. Each document identifier in the first list of document identifiers is representative of a document that includes a first keyword of the plurality of keywords and a second keyword of the plurality of keywords. For each remaining keyword appearing in the one or more encrypted documents after the first keyword and the second keyword, the method includes determining, by the data processing hardware, a corresponding list of document identifiers. Each document identifier in the corresponding list of document identifiers is representative of a document that includes the first keyword, the second keyword, and the respective remaining keyword. The method also includes determining, by the data processing hardware, based on the first list of document identifiers and each corresponding list of document identifiers, a second list of document identifiers. Each document identifier in the second list of document identifiers is representative of a document that includes each of the plurality of keywords. The method also includes returning, by the data processing hardware, the second list of document identifiers obtained from the encrypted search index to the user device.

Implementations of the disclosure may include one or more of the following optional features. In some implementations, the encrypted search index includes, for each respective pair of keywords appearing in the one or more encrypted document, an encrypted value representative of a keyword pair list of document identifiers representative of a document that includes both of the keywords in the respective pair of keywords and an encrypted tag representative of the encrypted value and one of the keywords in the respective pair of keywords. Each encrypted value may be encrypted with a pseudorandom function key based on the pair of keywords and a secret master key.

The pseudorandom function key, in some examples, is based on a concatenation of the pair of keywords. Optionally, each encrypted tag is encrypted with a pseudorandom function key based on the one of the keywords and a secret master key. The encrypted search index may further include, for each respective pair of keywords appearing in the one or more encrypted documents, a list of double tags. Each double tag in the list of double tags may include an encrypted hash of the corresponding encrypted tag for the respective pair of keywords.

In some implementations, determining the second list of document identifiers may include, for each remaining keyword appearing in the one or more encrypted documents after the first keyword and the second keyword, determining whether a double tag corresponding to the respective remaining keyword is present within the list of double tags and removing from the list of double tags each double tag that does not correspond to the respective remaining keyword. In some examples, accessing the encrypted search index to obtain the first list of document identifiers includes retrieving the keyword pair list of document identifiers that corresponds to the first keyword and the second keyword.

The search query may include a token representative of the first keyword and the second keyword and, for each remaining keyword appearing in the one or more encrypted documents after the first keyword and the second keyword, a token representative of the first keyword and the respective remaining keyword. In some implementations, returning the second list of document identifiers obtained from the encrypted search index to the user device causes the user device to decrypt the second list of document identifiers using a secret master key.

Another aspect of the disclosure provides a system for performing encrypted search over encrypted data with reduced volume leakage. The system includes data processing hardware and memory hardware in communication with the data processing hardware. The memory hardware stores instructions that when executed on the data processing hardware cause the data processing hardware to perform operations. The operations include receiving a search query for a plurality of keywords from a user device associated with a user. The plurality of keywords appear in one or more encrypted documents within a corpus of encrypted documents stored on an untrusted storage device. The operations also include accessing an encrypted search index to obtain a first list of document identifiers. Each document identifier in the first list of document identifiers is representative of a document that includes a first keyword of the plurality of keywords and a second keyword of the plurality of keywords. For each remaining keyword appearing in the one or more encrypted documents after the first keyword and the second keyword, the operations include determining a corresponding list of document identifiers. Each document identifier in the corresponding list of document identifiers is representative of a document that includes the first keyword, the second keyword, and the respective remaining keyword. The operations also include determining based on the first list of document identifiers and each corresponding list of document identifiers, a second list of document identifiers. Each document identifier in the second list of document identifiers is representative of a document that includes each of the plurality of keywords. The operations also include returning the second list of document identifiers obtained from the encrypted search index to the user device This aspect may include one or more of the following optional features. In some implementations, the encrypted search index includes, for each respective pair of keywords appearing in the one or more encrypted document, an encrypted value representative of a keyword pair list of document identifiers representative of a document that includes both of the keywords in the respective pair of keywords and an encrypted tag representative of the encrypted value and one of the keywords in the respective pair of keywords. Each encrypted value may be encrypted with a pseudorandom function key based on the pair of keywords and a secret master key.

The pseudorandom function key, in some examples, is based on a concatenation of the pair of keywords. Optionally, each encrypted tag is encrypted with a pseudorandom function key based on the one of the keywords and a secret master key. The encrypted search index may further include, for each respective pair of keywords appearing in the one or more encrypted documents, a list of double tags. Each double tag in the list of double tags may include an encrypted hash of the corresponding encrypted tag for the respective pair of keywords.

In some implementations, determining the second list of document identifiers may include, for each remaining keyword appearing in the one or more encrypted documents after the first keyword and the second keyword, determining whether a double tag corresponding to the respective remaining keyword is present within the list of double tags and removing from the list of double tags each double tag that does not correspond to the respective remaining keyword. In some examples, accessing the encrypted search index to obtain the first list of document identifiers includes retrieving the keyword pair list of document identifiers that corresponds to the first keyword and the second keyword.

The search query may include a token representative of the first keyword and the second keyword and, for each remaining keyword appearing in the one or more encrypted documents after the first keyword and the second keyword, a token representative of the first keyword and the respective remaining keyword. In some implementations, returning the second list of document identifiers obtained from the encrypted search index to the user device causes the user device to decrypt the second list of document identifiers using a secret master key.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 7A-7D are schematic views of formal descriptions for the system to perform conjunctive queries.

FIGS. 8A-8D are schematic views of formal descriptions for the system to perform conjunctive normal form (CNF) queries.

Like reference symbols in the various drawings indicate like elements.

DETAILED DESCRIPTION

Figure 1:
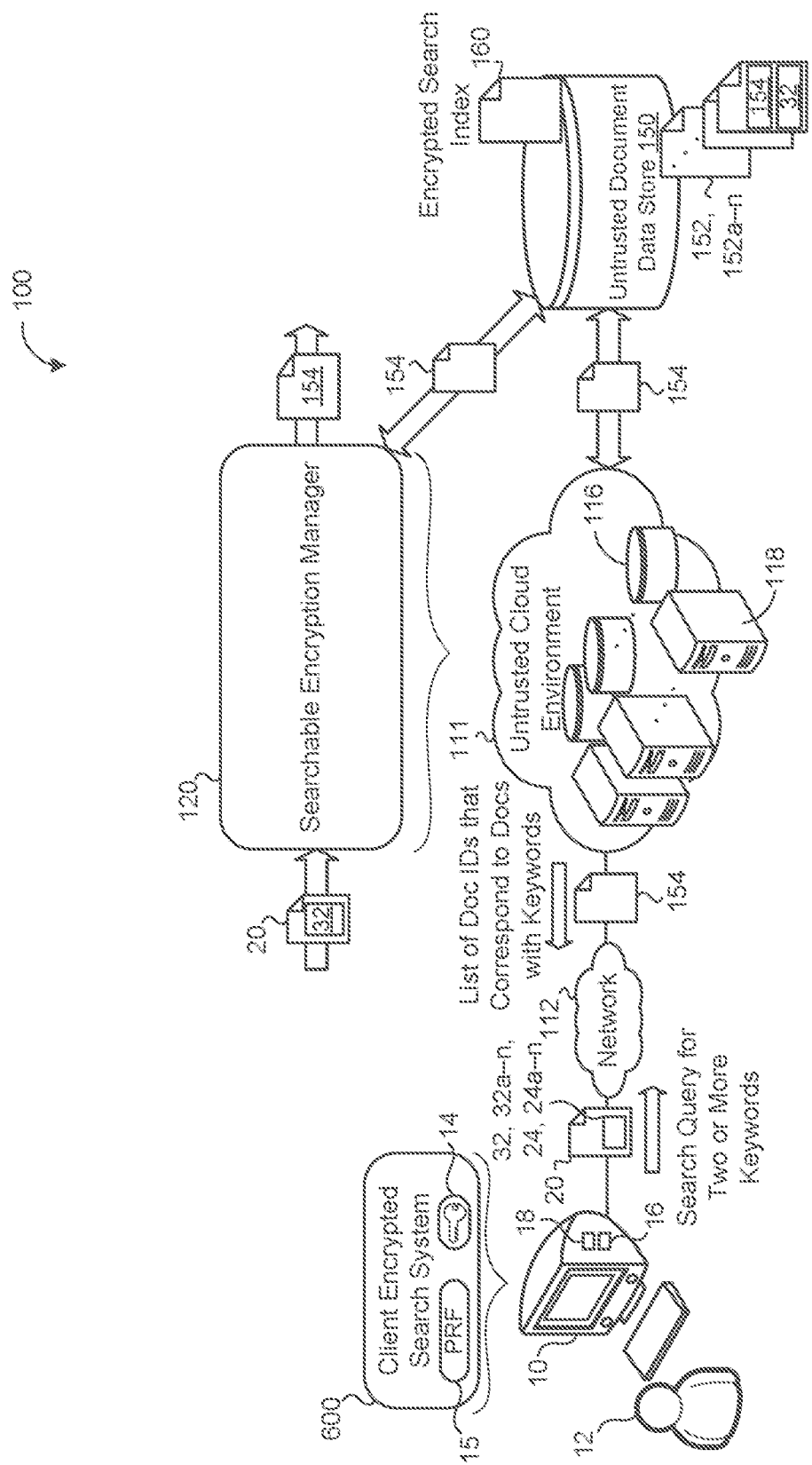
FIG. 1 is a schematic view of an example system that provides encrypted search over encrypted data with reduced volume leakage.

Searchable encryption (which may also be referred to as encrypted search or structured encryption) has been increasing in popularity. The goal of searchable encryption is to enable a client to outsource the storage of a corpus of encrypted documents to an untrusted server. For example, the client may wish to store a large number of documents (or any other item uploaded to the server, such as pictures, emails, etc.) securely in a cloud-based storage solution. The term documents is used generally, and may represent any sort of digital files (e.g., pictures, songs, database entries, etc.). Typically, the client will want to keep the ability to efficiently search the documents (i.e., search for one or more specific keywords), while simultaneously maintaining the privacy and security of the documents that encryption provides. In order to maintain this privacy, information related to the contents of the documents or the queries from the client must remain hidden from the untrusted server. A common way to address this problem is the creation of a separate encrypted search index (i.e., an encrypted multi-map) that indexes the keywords and associated document identifiers of all of the documents stored on the untrusted server. To enable efficient construction, encrypted search indexes are typically allowed to leak a well-defined and "reasonable" amount of information.

This search index is encrypted with a key the untrusted server does not have access to and then stored along with the documents. The client may then generate a search query that the server evaluates against the encrypted search index. The evaluation results in the encrypted document identifiers associated with the keyword of the search query, which the untrusted server returns to the client. In this way, the client receives a list of document identifiers of documents that include the keyword while minimizing information leakage (e.g., to the untrusted server).

Conjunctive queries are queries that contain one or more keywords and the response should consist of the set of documents that each include each of the queried keywords. For example, consider a client submitting the conjunctive query $k_1 \wedge k_2 \wedge \ldots \wedge k_q$ to a remote storage system that implements an encrypted search index. A naive approach performs q searches of the encrypted search index to obtain a set of document identifiers that includes each respective keyword individually. Each of the q sets of document identifiers may be returned to the client and the client may perform the conjunction of all of the sets locally. In this case, the amount of information communicated to the client is likely substantially greater than optimal. That is, this approach communicates each value in the conjunction set q times. This is exacerbated by the fact that many if not most of the document identifiers returned do not include each of the keywords, and therefore needlessly leak information. In the ideal scenario, the remote storage system returns only document identifiers that include each of the queried keywords to minimize leakage.

Implementations herein are directed toward a system that includes an encrypted search index that supports expressive Boolean queries (e.g., conjunctive queries and/or conjunctive normal form (CNF) queries) that suppresses volume leakage without compromising efficiency or utility. The system includes an encrypted search index that contains an encrypted hash for each pair of keywords that appear in a corpus of encrypted documents stored on an untrusted storage device. Each encrypted hash represents a list of document identifiers that include the pair of keywords. The list of document identifiers that include the pair of keywords is used to filter results from remaining keywords in a query, thus greatly minimizing the amount of information communicated to the client and the amount of information leaked to the untrusted storage device.

Referring now to FIG. 1, in some implementations, an example system 100 includes a user device 10 associated with a respective user or client 12 and in communication with an untrusted remote system 11 via a network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 11 may be a single computer, multiple computers, or a distributed system (e.g., a cloud environment) having scalable/elastic computing resources 118 (e.g., data processing hardware) and/or storage resources 116 (e.g., memory hardware). An untrusted document data store 150 (i.e., a remote storage device 150) is overlain on the storage resources 116 to allow scalable use of the storage resources 116 by one or more of the client or computing resources 118. The document data store 150 is configured to store a corpus of documents 152, 152a-n. Each document 152 includes a document identifier 154 that uniquely identifies the associated document 152 (e.g., a document name). Each document 152 also includes a set of keywords 32. The set of keywords 32 includes all keywords that appear in the associated encrypted document 152 that the user 12 may search for. As used herein, a document 152 may refer to any item uploaded onto the remote system 11 for storage within the document data store 150, such as, without limitation, emails, calendar events, notes, database entries, pictures, audio files, etc. In some implementations, the user device 10 executes a Searchable Encryption (SE) manager 120 for managing access to the encrypted documents 152 within the data storage 150.

The user 12 may interact with the SE manager 120 via a software application (e.g., a web browser) executing on the user device 10. A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications. As discussed in more detail below, the user device 10 may execute a client encrypted search system 600 with a master key 14 and a pseudorandom function 15 for encrypting values stored within the untrusted data storage 150.

The SE manager 120 receives, from the user device 10, a search query 20 for a plurality of keywords 32 that appear in one or more of the encrypted documents 152 stored on the untrusted storage device 150. The SE manager 120 accesses an encrypted search index 160 to obtain a first list of document identifiers 154. Each document identifier 154 in the first list of document identifiers 154 is encrypted and representative of a document 152 that includes a first keyword 32 of the plurality of keywords 32 and a second keyword 32 of the plurality of keywords 32. That is, the SE manager 120 obtains from the search index 160 a list of document identifiers 154 representative of documents 152 that each include two of the plurality of keywords 32. As discussed in more detail below, the search index 160 includes a corresponding list of document identifiers 154 for each pair of keywords 32 that appear in the documents 152. For example, when the SE manager 120 receives a query 20 that includes a search for keywords 32 "cat," "dog," "elephant," and "fox," the SE manager 120 would access the encrypted search index 160 to obtain the list of document identifiers 154 corresponding to documents 152 that include any two of "cat", "dog", "elephant", and "fox" (e.g., both "cat" and dog" or both "cat" and fox").

As discussed in more detail below, in some examples, the search query 20 includes a token 24 representative of the first keyword 32 and the second keyword 32. The search query 20 may also include, for each remaining keyword 32 in the query 20 after the first keyword 32 and the second keyword 32, a token 24 representative of the first keyword 32 and the remaining keyword 32.

For each remaining keyword 32 appearing in the one or more encrypted documents after the first keyword and the second keyword, the SE manager 120 determines a corresponding list of document identifiers 154 representing documents 152 that include the first keyword, the second keyword, and the respective remaining keyword. The keywords 32 may be processed in any order irrespective of any order of keywords 32 in the search query 20 or the documents 152. Returning to the previous example of a query 20 that includes the keywords 32 "cat," "dog," "elephant," and "fox," the SE manager 120 may first obtain the list of document identifiers 154 that include the keywords 32 "cat" and "dog." The SE manager 120 may then, for each remaining keyword 32 (i.e., "elephant" and "fox"), determine a corresponding list of document identifiers 154 that include "cat," "dog," and the remaining keyword. In this example, the SE manager 120 determines two corresponding lists of document identifiers: a first list of document identifiers that represents documents 152 that each include the keywords 32 "cat," "dog," and "elephant," and a second list of document identifiers 154 that represents documents 152 that each include the keywords 32 "cat," "dog," and "fox."

The SE manager 120 determines, based on the first list of document identifiers 154 (i.e., the list of document identifiers 154 representative of documents 152 that each include the first keyword 32 and the second keyword 32) and each corresponding list of document identifiers 154 (i.e., the lists of document identifiers 154 representative of documents 152 that each include the first keyword 32, the second keyword, and a remaining keyword 32), a second list of document identifiers 154 with each document identifier 154 representative of a document 152 that includes each of the plurality of keywords 32 of the query 20. Again returning to the previous example, the second list of document identifiers 154 is representative of each document 152 that includes each of "dog," cat," elephant," and "fox." The SE manager 120 returns the second list of document identifiers 154 obtained from the encrypted search index 160 to the user device 10. The user device may decrypt the second list of document identifiers 154 using, for example, the secret master key 14.

Figure 2:
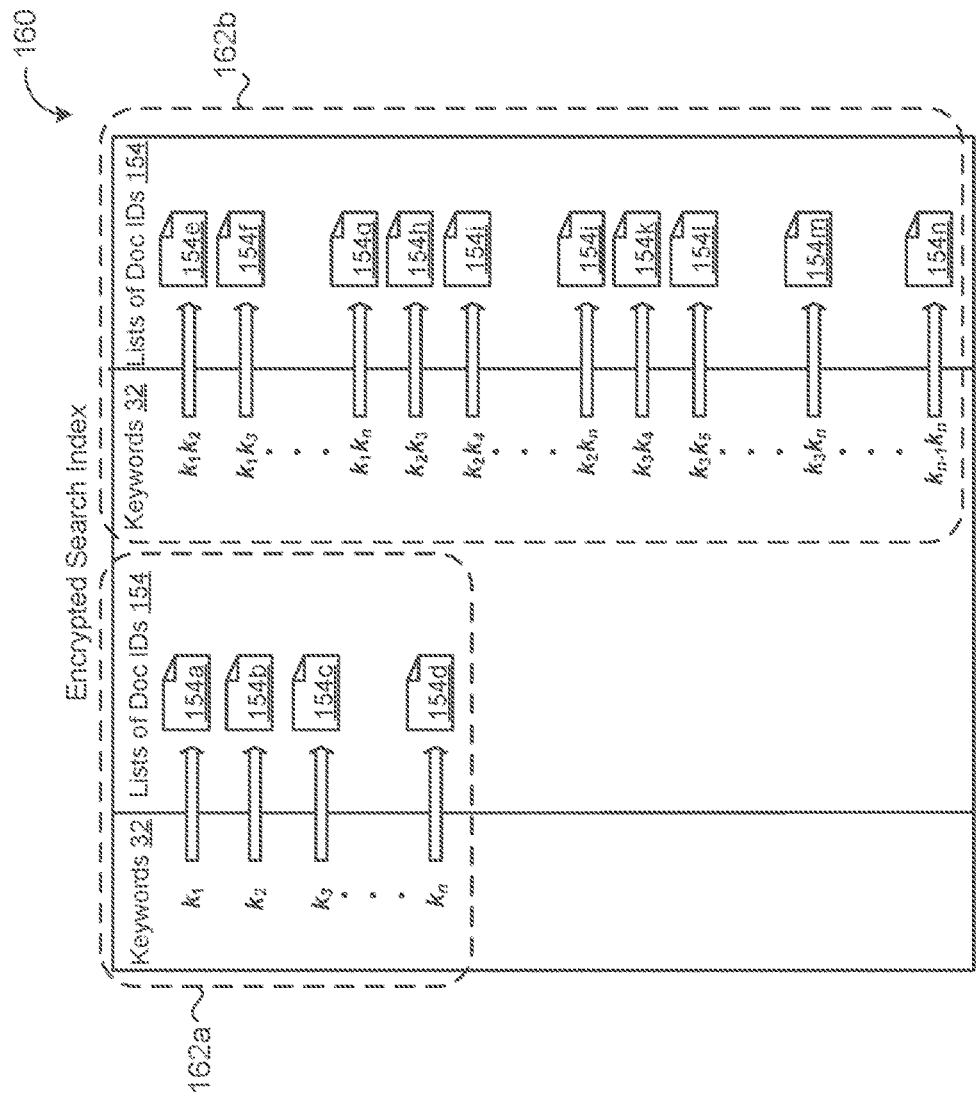
FIG. 2 is a schematic view of exemplary components of an encrypted search index.

Referring now to FIG. 2, in some implementations, the encrypted search index 160 includes a first portion 162a that associates each keyword 32 $k_1$, $k_2$, $k_3$, . . . , $k_n$ with a corresponding list of document identifiers 154, 154a-n. Each document identifier 154 in each list is representative of a document 152 that includes the corresponding keyword 32. In the example shown, the keyword 32 $k_1$ is associated with a list of document identifiers 154a. Each document identifier 154a represents, or is associated with, a document 152 that includes the keyword 32 $k_1$. Each keyword 32 that the user 12 may include in a query 20 includes a corresponding list of document identifiers 154. When the SE manager 120 receives a query 20 from the user device 10 for only a single keyword 32, the SE manager 120 may simply return the corresponding list of document identifiers 154 associated with the single queried keyword 32.

The encrypted search index 160, in some examples, also includes a second portion 162b that associates each pair of keywords 32 with a corresponding list of document identifiers 154, 154e-n. That is, every combination of pairs of keywords 32 is associated with a corresponding list of document identifiers 154 that each represent a document 152 that includes both of the keywords 32 of the pair. In the example shown, keywords $k_1$ and $k_2$ are associated with a list of document identifiers 154e. Here, each document identifier 154e includes both $k_1$ and $k_2$. Similarly, the pair of keywords 32 $k_1$ and $k_3$ is associated with a list of document identifiers 154f and keywords 32 $k_1$ and $k_n$ are associated with a list of document identifiers 154g.

Figure 3:
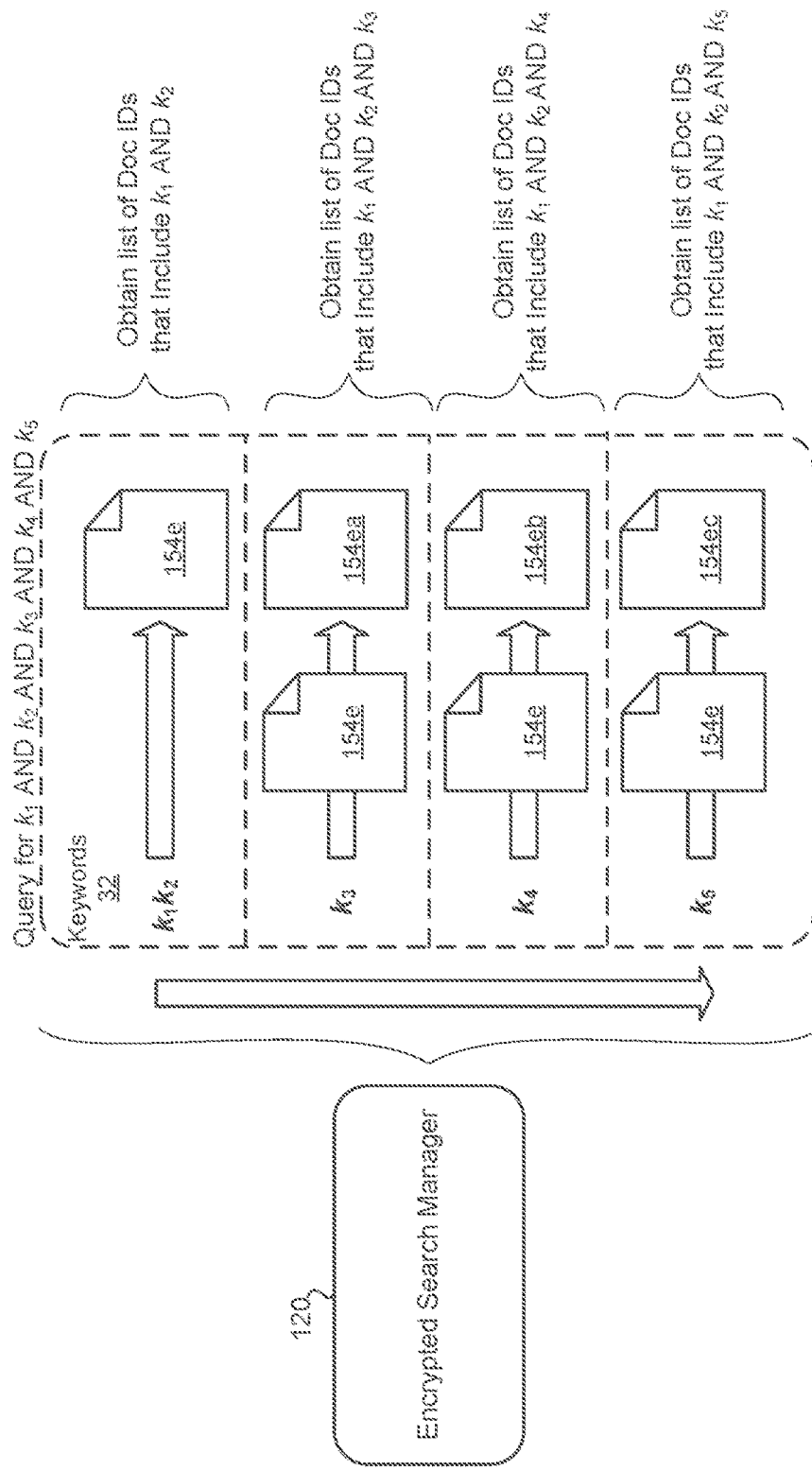
FIG. 3 is a schematic view of an encrypted search manager filtering a list of document identifiers.

Referring now to FIG. 3, in some examples, the SE manager 120, after receiving a query 20, first obtains a list of document identifiers 154 that include a first keyword 32 and a second keyword 32. The SE manager 120 may obtain this list based on the token 24 (FIG. 1) corresponding to the first keyword 32 and the second keyword 32 of the query. In this example, the SE manager 120 has received a query 20 that includes the keywords 32 $k_1$, $k_2$, $k_3$, $k_4$, and $k_5$. That is, the user device 10 has sent a query 20 that requests return of document identifiers 154 that represent the documents 152 that include each of the keywords 32 $k_1$-$k_5$. As discussed in more detail below, the corresponding list of document identifiers 154 is used to filter the results for each of the remaining keywords 32 (in any order) in the query 20. Here, the SE manager 120 retrieves a list of document identifiers 154e associated with keywords $k_1$ and $k_2$, however the SE manager 120 may retrieve a list of document identifiers 154 that correspond to any pair of keywords 32 included in the query 20 (e.g., $k_2$ and $k_5$, $k_3$ and $k_4$, $k_1$ and $k_5$, etc.). In some implementations, the user device 10 specifies which pair of keywords 32 to select (e.g., via the token 24), while in other implementations the SE manager 120 determines which pair of keywords 32 to select. In some examples, it is advantageous for the user device 10 or the SE manager 120 to select the pair of keywords 32 that is most likely to correspond to a small number of document identifiers 154, as decreasing the number of document identifiers 154 in the list may correspondingly decrease the amount of information leaked. For example, the user device 10 selects the two least common keywords 32 included in the query 20, as the least common keywords 32 may be most likely to correspond to a small number of document identifiers 154. The user device 10 and/or the SE manager 120 may reference a database or other data structure to determine the most or least common keywords 32 in the query 20.

After obtaining the list of document identifiers 154 that correspond to the first and second keywords 32 of the query 20, the SE manager 120 may determine (e.g., based on the remaining tokens 24 in the query 20), for each remaining keyword 32 in the query 20, a corresponding list of document identifiers 154 that include the remaining keyword 32 from the list of document identifiers 154 that included the first keyword 32 and the second keyword 32. In the example shown in FIG. 3, the SE manager 120 obtains a list of document identifiers 154ea by determining which document identifiers 154 in the list of document identifiers 154e (i.e., the list of document identifiers 154 that include both $k_1$ and $k_2$) include the keyword $k_3$. Similarly, the SE manager 120 also determines a list of document identifiers 154eb from the list of document identifiers 154e that include the keyword $k_4$ and a list of document identifiers 154ec from the list of document identifiers 154e that include the keyword $k_5$. This results in corresponding list of document identifiers 154ea that includes keywords 32 $k_1$, $k_2$, and $k_3$, a corresponding list of document identifiers 154eb that includes keywords 32 $k_1$, $k_2$, and $k_4$, and a corresponding list of document identifiers 154ec that includes keywords 32 $k_1$, $k_2$, and $k_5$.

Figure 4:
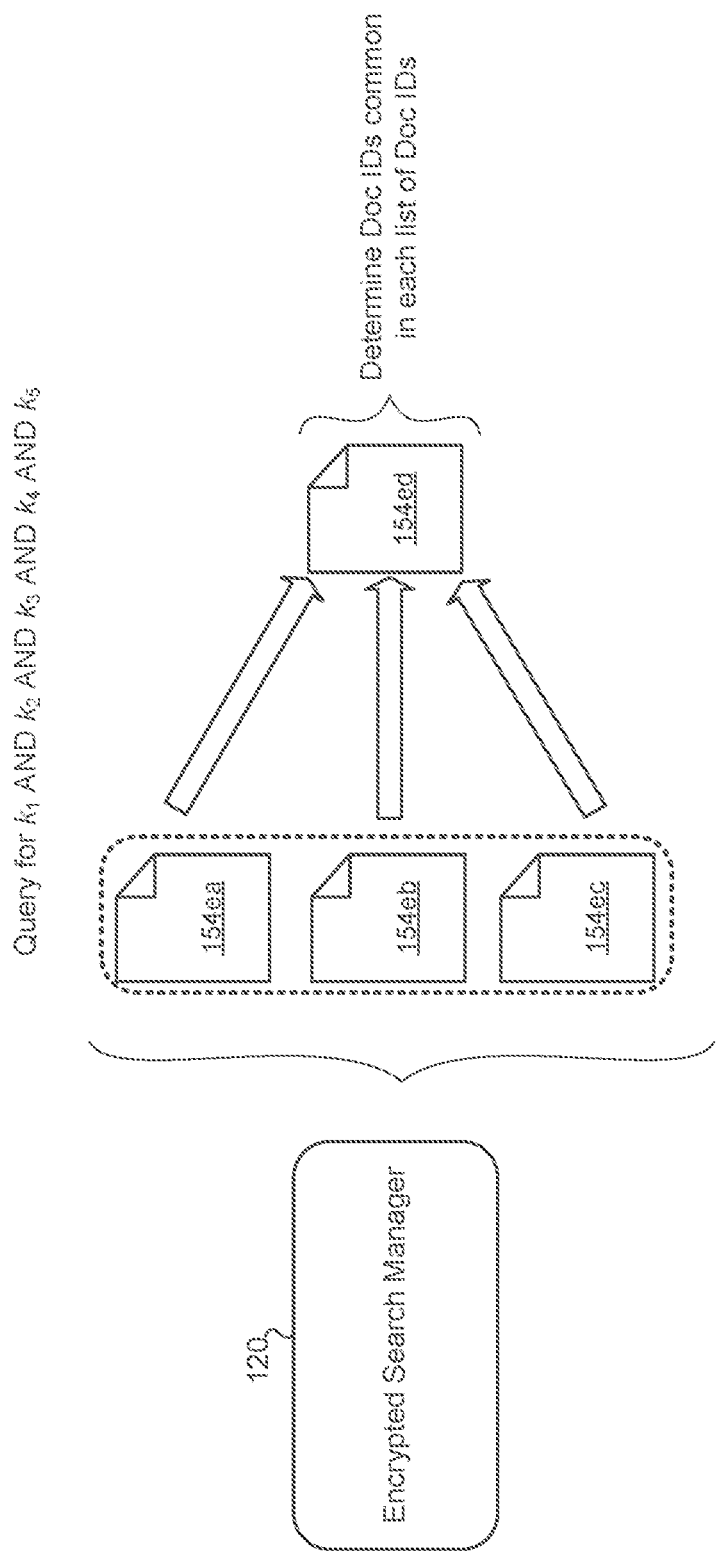
FIG. 4 is a schematic view of the encrypted search manager determining a second list of document identifiers based on the filtering of FIG. 3.

Referring now to FIG. 4, the SE manager 120, in some implementations, determines which document identifiers 154 are included in each of the corresponding lists of document identifiers 154 to obtain the second list of document identifiers 154 that represent the documents 152 that each include all of the keywords 32 in the query 20. Continuing the example from FIG. 3, FIG. 4 shows the SE manager 120 obtaining the corresponding lists of document identifiers 154ea, 154eb, 154ec in response to the query 20 for the keywords 32 $k_1$, $k_2$, $k_3$, $k_4$, and $k_5$ Based on these corresponding lists of document identifiers 154ea, 154eb, 154ec, the SE manager 120 determines a list of document identifiers 154ed. For example, the SE manager 120 determines which document identifiers 154 are common in the corresponding lists of document identifiers 154ea, 154eb, 154ec (i.e., appears in each list). Each document identifier 154ed represents a document 152 that includes each of the keywords 32 $k_1$, $k_2$, $k_3$, $k_4$, and $k_5$. The second list of document identifiers 154ed is returned to the user device 10 in response to the query 20.

Figure 5:
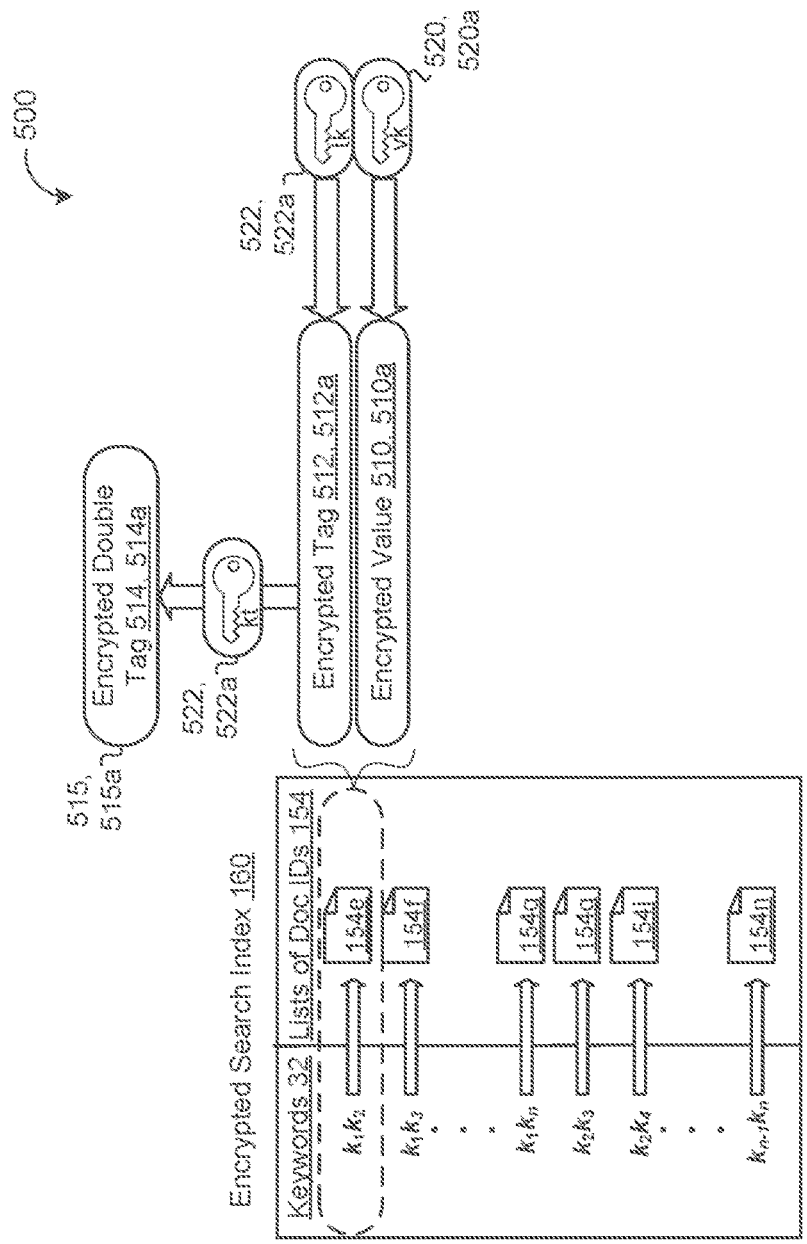
FIG. 5 is a schematic view of the encrypted search index with encrypted tags and values.

Referring now to FIG. 5, in some implementations, a schematic view 500 shows the encrypted search index 160 including, for each respective pair of keywords 32 appearing in the encrypted documents 152 stored on the untrusted storage device 150, an encrypted value 510 representative of a keyword 32 pair list of document identifiers 154 representative of a document 152 that includes both of the keywords 32 in the respective pair of keywords 32 and an encrypted tag 512 representative of the encrypted value 510 and one of the keywords 32 in the respective pair of keywords 32. In the example shown, the pair of keywords 32 $k_1$ and $k_2$ have a corresponding list of document identifiers 154e representative of documents 152 that include both keywords 32 $k_1$ and $k_2$. The pair of keywords 32 $k_1$ and $k_2$ are associated with an encrypted value 510a and an encrypted tag 512a.

The encrypted value 510 may be a representation of the list of document identifiers 154 corresponding to the associated pair of keywords 32. That is, the user device 10, after decrypting the encrypted value 510, may recover the associated list of document identifiers 154 from the decrypted value. The encrypted tag 512 may represent the associated pair of keywords 32 that correspond to the associated encrypted value 510. Thus, when the SE manager 120 accesses the encrypted search index 160 to obtain a list of document identifiers 154 that correspond to a pair of keywords 32, the SE manager 120 may access the encrypted value 510 associated with the encrypted tag 512 that corresponds to the pair of keywords 32. In some implementations, the encrypted value 510 is encrypted via a value key 520 while the encrypted tag 512 is encrypted with a tag key 522. Because both the value key 520 and the tag key 522 may depend upon one or both of the keywords 32 associated with the corresponding encrypted value 510/encrypted tag 512, each value key 520 and each tag key 522 is unique. In the example shown, the pair of keywords 32 $k_1$ and $k_2$ are associated with an encrypted value 510a and an encrypted tag 512a. The SE manager 120, when accessing the encrypted search index 160 to obtain the first list of document identifiers 154 representing documents 152 that include the first keyword 32 and the second keyword 32, the SE manager 120 may retrieve the keyword 32 pair list of document identifiers 154 (e.g., the encrypted value 510) that corresponds to the first keyword 32 and the second keyword 32 (e.g., the encrypted tag 512).

In some implementations, the encrypted search index 160 further includes, for each respective pair of keywords 32 appearing in the documents 152, a list of double tags 514, each double tag 514 in the list of double tags 514 including an encrypted hash 515 of the corresponding encrypted tag 512 for the respective pair of keywords 32. That is, the double tags 514 may be hashes (e.g., using the tag key 522) of the encrypted tags 512. Here, the encrypted double tag 514a is generated from the encrypted tag 512a by encrypting the tag 512a with the corresponding tag key 522a. As discussed below, the addition of the double tags 514 increases the efficiency of the encrypted search index 160.

When the SE manager 120 determines the second list of document identifiers 154 (i.e., the list of document identifiers 154 representative of documents 152 that each include each of the keywords 32 of the query 20), in some examples, for each remaining keyword 32 appearing in the one or more encrypted documents 152 after the first keyword 32 and the second keyword 32, the SE manager 120 determines whether a double tag 514 corresponding to the respective remaining keyword 32 is present within the list of double tags 514. The SE manager 120 may remove from the list of double tags 514 each double tag 514 that does not correspond to the respective remaining keyword 32. Thus, the SE manager 120 removes, for each remaining keyword 32 of the query 20, the double tags 514 that do not include at least one of the keywords 32 in the query 20. After the SE manager 120 evaluates each remaining keyword 32, the only remaining double tags 514 represent the second list of document identifiers 154. This allows the SE manager 120 to quickly and efficiently filter the first list of document identifiers 154 that each represent a document 152 that includes the first keyword 32 and the second keyword 32.

Figure 6A:
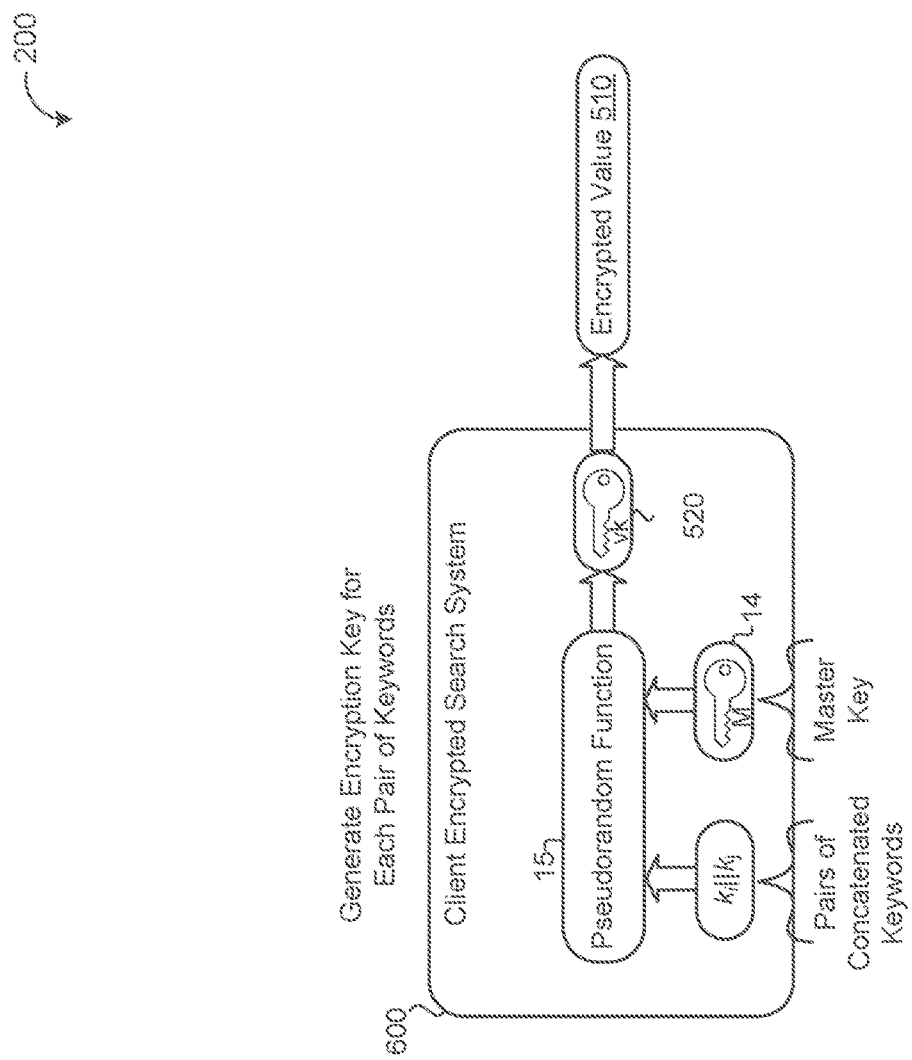
FIGS. 6A and 6B are schematic views of a client encrypted search system.
Figure 6B:
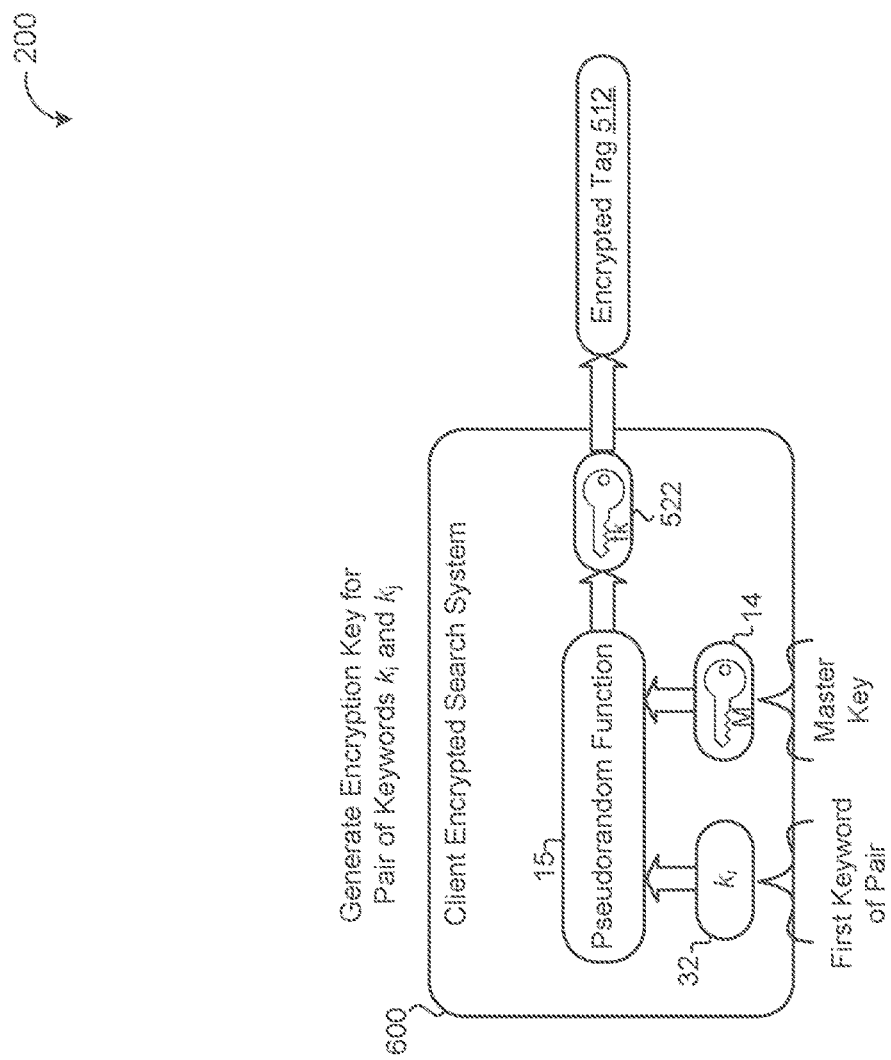

Referring now to FIG. 6A, in some examples, the client encrypted search system 600 generates each encrypted value 510 by encrypting the encrypted value 510 with a value key 520 (e.g., a pseudorandom function key) based on the associated pair of keywords 32 and a secret master key 14. The pair of keywords 32 may be concatenated together. Optionally, the secret master key 14 is stored on the user device 10 and/or is only accessible by the user 12. A pseudorandom function 15 receives the corresponding pair of concatenated keywords 32 and the secret master key 14 and generates a corresponding value key 520 that encrypts the corresponding encrypted value 510. That is, each value key 520 is based on both keywords 32 in the keyword pair. As shown in FIG. 6B, the client encrypted search system 600 may also generate each encrypted tag 512 by encrypting each encrypted tag 512 with the tag key 522 (i.e., a pseudorandom function key) based on one of the keywords 32 of the pair of keywords 32 and the secret master key 14. That is, while the encrypted value 510 may be based off a value key 520 generated based on both keywords 32 in the pair of keywords 32, the encrypted tag may be based off a tag key 522 generated based on one of the keywords 32 in the pair of keywords 32. In FIG. 6B, the client encrypted search system 600 generates the tag key 522 for the pair of keywords 32 $k_i$ and $k_j$ using the keyword 32 k; and the master key 14. However, the client encrypted search system 600 may also generate the tag key 522 based on the keyword 32 $k_i$.

Referring now to FIGS. 7A-7D, schematics 700a-d provide a formal description for the construction of the client encrypted search system 600 and the SE manager 120 to create and respond to a conjunctive query 20 including two or more keywords 32. Schematic 700a provides a formal description for the encrypted search index 160 (i.e., the encrypted multi-map or EMM). At steps 1 and 2, the user device 10 randomly selects keys for the pseudorandom function 15 and secret master key 14. At step 3, the multi-map is initialized and at step 4, the user device 10 generates the corresponding encrypted value 510 and encrypted tag 512 for each pair of keywords 32. At step 5, the multi-map is encrypted and forms the encrypted search index 160. At step 6, the set of double tags 514 is initialized and at step 7, the user device 10 generates each double tag 514 for each pair of keywords 32. The user device, at step 8, randomly permutes the set of double tags 514 and sends the encrypted search index 160 to the storage device 150 at step 9.

Schematic 700b of FIG. 7B provides a formal description for a technique for the user device 10 to generate the search query 20. At step 1, the user device 10 generates the first token 24 based on the first pair of keywords 32. At step 2, the user device 10 encrypts the first token 24 based on a concatenation of the first keyword 32 and the second keyword 32. At step 3, the user device 10 generates the remaining tokens 24 for each remaining keyword 32. At step 4, the user device 10 transmits the search query 20 with each generated token 24 included.

Schematic 700c of FIG. 7C provides a formal description for a technique for the SE manager 120 to determine the appropriate list of document identifiers 154 to respond to the search query 20. At step 1, the SE manager 120 retrieves the encrypted values 510 and encrypted tags 512 associated with the tokens 24 of the search query 20. At step 2, the SE manager 120 retrieves all encrypted tags 512 associated with the first keyword 32 and the second keyword 32. At step 2, the SE manager 120 decrypts the retrieved encrypted tags 512 using the encryption keys sent by the user device 10 within the search query 20 (e.g., the tokens 24). At step 3, the response set is initialized to null and at step 4, for each remaining keyword 32 after the first keyword 32 and the second keyword 32, the SE manager 120 computes the corresponding double tag 514 and filters the response set to only include the document identifiers 154 that include each of the keywords 32 in the query 20. At step 5, the SE manager 120 returns the response set of document identifiers 154 to the user device 10.

Schematic 700d of FIG. 7D provides the formal description for a technique for the user device 10 to retrieve the document identifiers 154 from the response sent by the SE manager 120. The user device 10, at step 1, may simply decrypt the encrypted values 510 using the corresponding key 520.

Thus, to maintain efficiency while minimizing leakage, the user device 10 constructs an additional set $\mathcal{X}$ of double tags 514 that is stored with the encrypted search index 160 at the untrusted storage device. For each pair of keys (a, b), the double tag 514 is added to X for each value v∈MM[a∧b]. The user device 10 pseudorandomly generates the pseudorandom function (PRF) key $K_{a,b}^x$ from the secret master key 14 thus depends solely on the pair of keys (a, b). The double tag 514 may be essentially a hash of the encrypted tag 512 that is also stored within the encrypted search index 160. The SE manager 120 may then filter the list of document identifiers 154 corresponding to the first keyword 32 and the second keyword 32 by utilizing the set $\mathcal{X}$. For example, for the SE manager 120 to filter the list of document identifiers 154 (i.e., the set T) to only keep values that include the keyword 32 $k_3$ (i.e., compute the set T∩MM[$k_3$]), the client reveals PRF key $K_{k_1,k_3}^x$. The SE manager 120 evaluates each tag in T using $K_{k_1,k_3}^x$ and checks whether the resulting PRF output appears in $\mathcal{X}$ or not. Only the pairs whose resulting PRF output appears in $\mathcal{X}$ is kept in the set T. With a careful choice of $\mathcal{X}$, only values that also appear in MM[$k_1 \wedge k_3$] will have the corresponding PRF outputs under key $K_{k_1,k_3}^x$ appear in $\mathcal{X}$. By repeating this filtering technique for all remaining keywords 32 (i.e., $k_3, \ldots, k_q$) the SE manager 120 successfully computes the q-conjunction. This technique only leaks the volume of the 2-conjunctive query $k_1 \wedge k_2$.

While the examples herein are directed responding to conjunctive queries 20, the techniques herein may also apply to more complex queries 20 such as conjunctive normal form (CNF) queries 20. FIGS. 8A-8D include schematics 800a-d that provide a formal description for the construction of the client encrypted search system 600 and the SE manager 120 to create and respond to a CNF query 20 including three or more keywords 32.

FIG. 8A provides a formal description with schematic 800a for the encrypted search index 160 (i.e., the encrypted multi-map or EMM). The setup for the encrypted search index 160 for CNF queries 20 is the same as the encrypted search index for conjunctive queries (FIG. 7A). Schematic 800b of FIG. 8B provides a formal description for a technique for the user device 10 to generate a CNF search query 20, while schematic 800c of FIG. 8C provides the formal description for the searching the encrypted search index 160 for a CNF query 20. Finally, schematic 800d of FIG. 8I) provides the formal description for the user device 10 to decrypt the response from the SE manager 120.

To explain the formal descriptions of schematics 800a-d, an example starts with the simple case of a CNF formulae ϕ=$D_1 \wedge D_2$ with only two clauses, with each clause denoted $D_d = k_{d,1} \vee \ldots \vee k_{d,q_d}$ for all d∈{1, 2}. For all i∈{1, ..., $q_i$}, the set $S_i$ is defined herein as:

$$S_i := \left( MM[k_{1,i}] \cap \frac{MM[D_2]}{MM[k_{1,i}] \cap (\cup_{r=i+1}^{q_1} MM[k_{1,r}]) \cap MM[D_2]} \right.$$

The system 100 utilizes the fact that any pair of sets $S_i$ and $S_j$ are disjoint as long as i≠j. Furthermore, the union of all $q_1$ sets is equal to MM[$D_1 \wedge D_2$]. The SE manager 120 may compute the sets $S_1, \ldots, S_{q1}$ and return their union as the answer.

For a query ϕ=$D_1 \wedge D_2$, the client encrypted search system 600 may compute separate tokens $tok_1, \ldots, tok_{q1}$. The token for ϕ is simply the concatenation of each of the computed tokens $tok_1, \ldots, tok_{q1}$. Each token $tok_i$ contains the decryption keys for all encrypted tags 512 in each tuple. As a result, the SE manager 120 may compute hashed sets for MM[$k_{1,i} \wedge k_{2,1}$], ..., MM[$k_{1,i} \wedge k_{2,q2}$]. Using the encrypted tags 512, the SE manager 120 may also compute the union of all $q_2$ sets, denoted as $S_i$ that is a superset of the final response. In the example, $S_i$ is currently equal to the set MM[$k_{1,i}$]∩MM[$D_2$].

However, to ensure that all parts are disjoint, the SE manager 120 filters each $S_i$ and removes the set MM[$k_1$]∩($\cup_{r\in(i+1, \ldots, q_1)}$MM[$k_{1,4}$])∩MM[$D_3$] from $S_i$. Similar to conjunctive queries 20, the SE manager 120 iteratively filters for each of the sets MM[$k_{1,i} \wedge D_2 \wedge k_{1,j}$] for all j∈{i+1, ..., $q_1$}. To accomplish this for any j, the user device 10 sends the PRF key $K_{k_{1,i},k_{1,j}}$ to the SE manager 120. The SE manager 120 may hash every encrypted tag 512 that is in $S_i$ using the received PRF key and may check whether the resulting output appears in X or not. Every pair whose hashed tag 512 appears in X may be safely removed from $S_i$ as it must appear in the set MM[$k_{1,i} \wedge k_{1,j} \wedge D_2$]. In general, the user device 10 may send the PRF keys $K_{k_{1,i},k_{1,j}}$ for all j∈{i+1, ..., $q_1$} that enables the SE manager 120 to repeat the filtering for all sets MM[$k_{1,i} \wedge D_2 \wedge k_{1,j}$]. Thus, the SE manager 120 computes all disjoint sets $S_1, \ldots, S_{q1}$ whose union is exactly the response set for MM[$D_1 \wedge D_2$] This technique may be extended to CNF queries 20 with any number of clauses.

For example, given a new clause $D_3 = (k_{3,1} \vee \ldots \vee k_{3,q3})$, the SE manager 120 may compute the filtered sets $S_1$∩MM[$D_3$], ..., $S_{q1}$∩MM[$D_3$] whose union corresponds to the response to the query 20 $D_1 \wedge D_2 \wedge D_3$. Because all tags 512 in each set $S_i$ are hashed under a PRF key 522 depending solely on one of the keywords 32 of the pair, it suffices to remove all items in $S_1$ that do not appear in any of the sets MM[$k_{1,i} \wedge k_{3,1}$], ..., MM[$k_{1,i} \vee k_{3,q3}$]. To accomplish this, the user device 10 transmits to the SE manager 120 the PRF keys $K_{k_{1,i},k_{3,1}}^x, \ldots, K_{k_{1,i},k_{3,q3}}^x$.

The SE manager 120 may hash each tag in $S_i$ under all $q_3$ keys and check whether the resulting hash appears in the X or not. For any tag in $S_i$ such that all $q_3$ hashes do not appear in X, the SE manager 120 may determine that the associated value 510 does not appear in any of the sets MM[$k_{1,i} \wedge k_{3,1}$], ..., MM[$k_{1,i} \wedge k_{3,q3}$] and remove the tag 512 from $S_i$. Thus, by removing all these tags 512, the SE manager 120 successfully computes $S_i \wedge D_3$ for all $q_1$ sets. For any CNF query 20 of the form $D_1 \wedge D_2 \wedge \ldots \wedge D_l$ the SE manager 120 may repeat the filtering as described above for all $D_3, \ldots, D_l$ to compute the final response to the query 20 for the user device 10.

Figure 9:
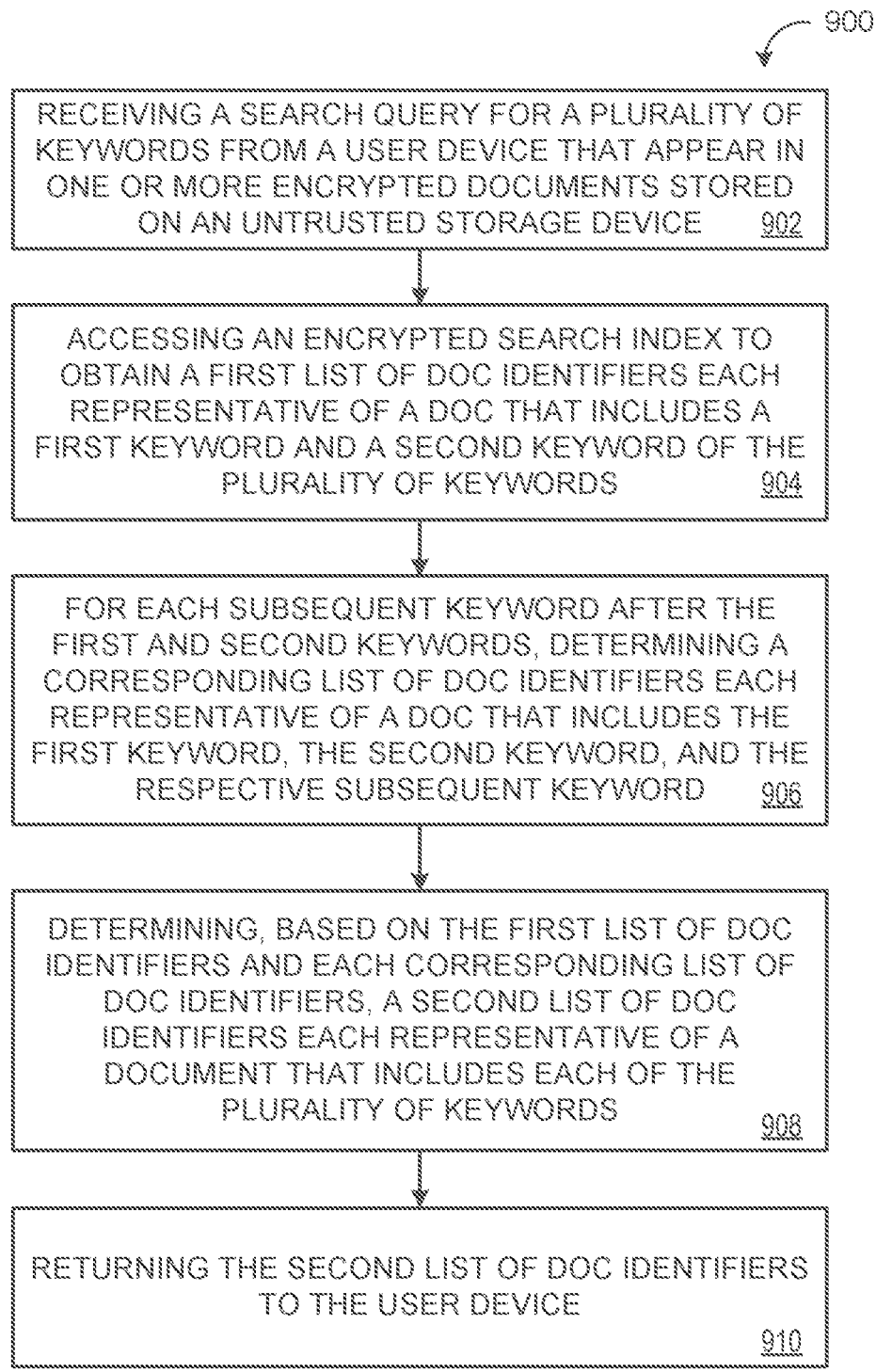
FIG. 9 is a flowchart of an example arrangement of operations for a method of providing encrypted search over encrypted data with reduced volume leakage.

FIG. 9 is a flowchart of an exemplary arrangement of operations for a method 900 for encrypted search over encrypted data with reduced volume leakage. The method 900 includes, at operation 902, receiving, at data processing hardware 118, a search query 20 for a plurality of keywords 32 from a user device 10 associated with a user 12. The plurality of keywords 32 appear in one or more encrypted documents 152 within a corpus of encrypted documents 152 stored on an untrusted storage device 150. At operation 904, the method 900 includes accessing, by the data processing hardware 118, an encrypted search index 160 to obtain a first list of document identifiers 154. Each document identifier 154 in the first list of document identifiers 154 is representative of a document 152 that includes a first keyword 32 of the plurality of keywords 32 and a second keyword 32 of the plurality of keywords 32.

The method 900, at operation 906, also includes, for each remaining keyword 32 appearing in the one or more encrypted documents 152 after the first keyword 32 and the second keyword 32, determining, by the data processing hardware 118, a corresponding list of document identifiers 154. Each document identifier 154 in the corresponding list of document identifiers 154 is representative of a document 152 that includes the first keyword 32, the second keyword 32, and the respective remaining keyword 32. At operation 908, the method 900 includes determining, by the data processing hardware 118, based on the first list of document identifiers 154 and each corresponding list of document identifiers 154, a second list of document identifiers 154. Each document identifier 154 in the second list of document identifiers 154 is representative of a document 152 that includes each of the plurality of keywords 32. The method 900, at operation 910, includes returning, by the data processing hardware 118, the second list of document identifiers 154 obtained from the encrypted search index 160 to the user device 10.

Figure 10:
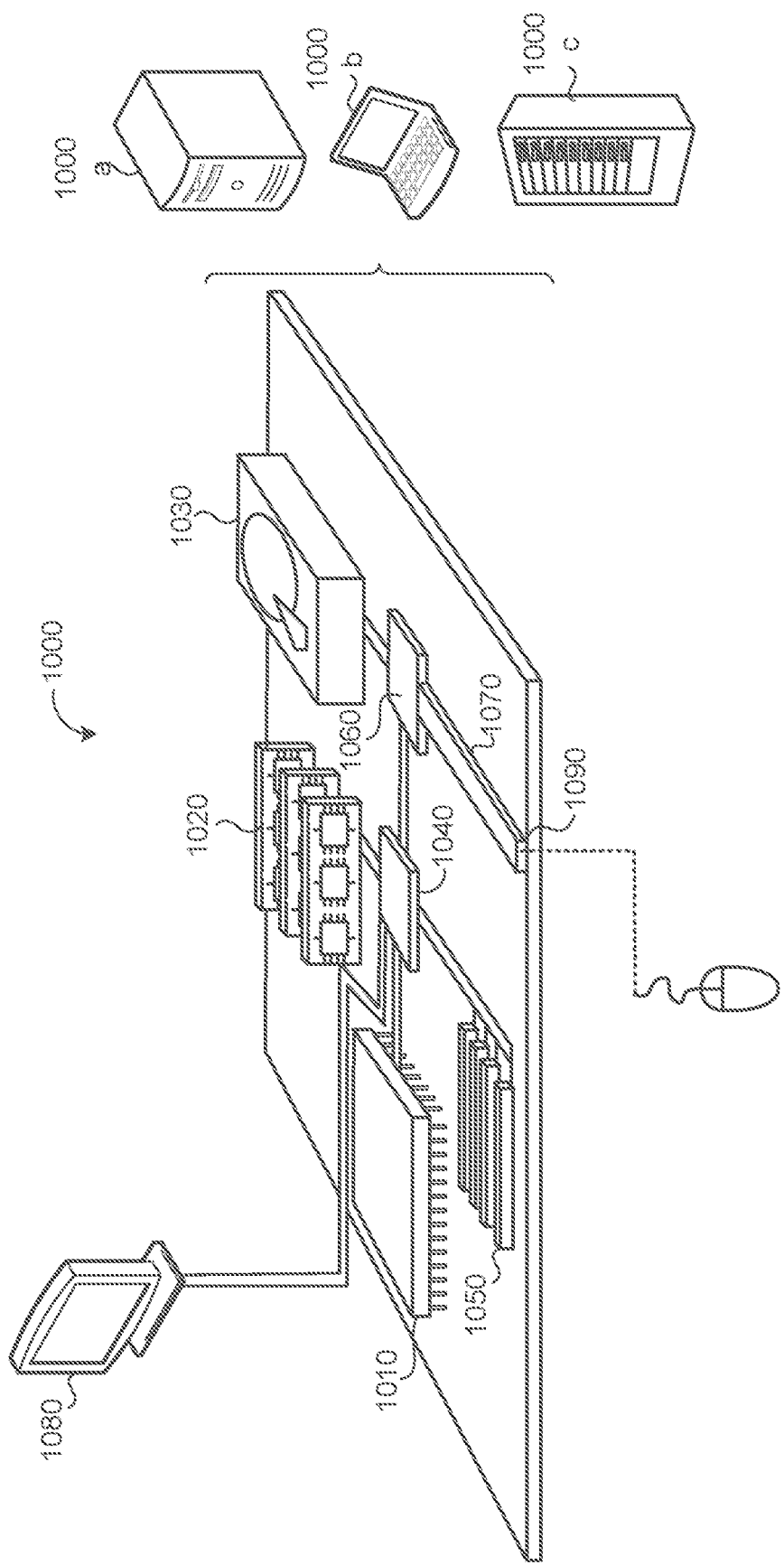
FIG. 10 is a schematic view of an example computing device that may be used to implement the systems and methods described herein.

FIG. 10 is schematic view of an example computing device 1000 that may be used to implement the systems and methods described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010, memory 1020, a storage device 1030, a high-speed interface/controller 1040 connecting to the memory 1020 and high-speed expansion ports 1050, and a low speed interface/controller 1060 connecting to a low speed bus 1070 and a storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and a low-speed expansion port 1090. The low-speed expansion port 1090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1000a or multiple times in a group of such servers 1000a, as a laptop computer 1000b, or as part of a rack server system 1000c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
  receiving, at data processing hardware, a search query for a plurality of keywords from a user device associated with a user, the plurality of keywords appearing in one or more encrypted documents within a corpus of encrypted documents stored on an untrusted storage device, wherein the user device encrypts the documents stored in the untrusted storage;
  accessing, by the data processing hardware, an encrypted search index to obtain a first list of document identifiers, each document identifier in the first list of document identifiers representative of a document that includes a first keyword of the plurality of keywords and a second keyword of the plurality of keywords, wherein the list of document identifiers that include the pair of keywords is used to filter results from remaining keywords in a query;
  for each remaining keyword appearing in the one or more encrypted documents after the first keyword and the second keyword, determining, by the data processing hardware, a corresponding list of document identifiers, each document identifier in the corresponding list of document identifiers representative of a document that includes the first keyword, the second keyword, and the respective remaining keyword;
  determining, by the data processing hardware, based on the first list of document identifiers and each corresponding list of document identifiers, a second list of document identifiers, each document identifier in the second list of document identifiers representative of a document that includes each of the plurality of keywords; and
  returning, by the data processing hardware, the second list of document identifiers obtained from the encrypted search index to the user device, wherein the user device decrypts the second list of document identifiers.

2. The method of claim 1, wherein the encrypted search index comprises, for each respective pair of keywords appearing in the one or more encrypted documents:
  an encrypted value representative of a keyword pair list of document identifiers representative of a document that includes both of the keywords in the respective pair of keywords; and
  an encrypted tag representative of the encrypted value and one of the keywords in the respective pair of keywords.

3. The method of claim 2, wherein each encrypted value is encrypted with a pseudorandom function key based on the pair of keywords and a secret master key.

4. The method of claim 3, wherein the pseudorandom function key is based on a concatenation of the pair of keywords.

5. The method of claim 2, wherein each encrypted tag is encrypted with a pseudorandom function key based on the one of the keywords and a secret master key.

6. The method of claim 2, wherein the encrypted search index further comprises, for each respective pair of keywords appearing in the one or more encrypted documents, a list of double tags, each double tag in the list of double tags comprising an encrypted hash of the corresponding encrypted tag for the respective pair of keywords.

7. The method of claim 6, wherein determining the second list of document identifiers comprises, for each remaining keyword appearing in the one or more encrypted documents after the first keyword and the second keyword:
  determining whether a double tag corresponding to the respective remaining keyword is present within the list of double tags; and
  removing from the list of double tags, each double tag that does not correspond to the respective remaining keyword.

8. The method of claim 2, wherein accessing the encrypted search index to obtain the first list of document identifiers comprises retrieving the keyword pair list of document identifiers that corresponds to the first keyword and the second keyword.

9. The method of claim 1, wherein the search query comprises:
 a token representative of the first keyword and the second keyword; and
 for each remaining keyword appearing in the one or more encrypted documents after the first keyword and the second keyword, a token representative of the first keyword and the respective remaining keyword.

10. The method of claim 1, wherein returning the second list of document identifiers obtained from the encrypted search index to the user device causes the user device to decrypt the second list of document identifiers using a secret master key.

11. A system comprising:
 data processing hardware; and
 memory hardware in communication with the data processing hardware, the memory hardware storing instructions that when executed on the data processing hardware cause the data processing hardware to perform operations comprising:
 receiving a search query for a plurality of keywords from a user device associated with a user, the plurality of keywords appearing in one or more encrypted documents within a corpus of encrypted documents stored on an untrusted storage device, wherein the user device encrypts the documents stored in the untrusted storage;
 accessing an encrypted search index to obtain a first list of document identifiers, each document identifier in the first list of document identifiers representative of a document that includes a first keyword of the plurality of keywords and a second keyword of the plurality of keywords, wherein the list of document identifiers that include the pair of keywords is used to filter results from remaining keywords in a query;
 for each remaining keyword appearing in the one or more encrypted documents after the first keyword and the second keyword, determining a corresponding list of document identifiers, each document identifier in the corresponding list of document identifiers representative of a document that includes the first keyword, the second keyword, and the respective remaining keyword;
 determining based on the first list of document identifiers and each corresponding list of document identifiers, a second list of document identifiers, each document identifier in the second list of document identifiers representative of a document that includes each of the plurality of keywords; and
 returning the second list of document identifiers obtained from the encrypted search index to the user device, wherein the user device decrypts the second list of document identifiers.

12. The system of claim 11, wherein the encrypted search index comprises, for each respective pair of keywords appearing in the one or more encrypted documents:
 an encrypted value representative of a keyword pair list of document identifiers representative of a document that includes both of the keywords in the respective pair of keywords; and
 an encrypted tag representative of the encrypted value and one of the keywords in the respective pair of keywords.

13. The system of claim 12, wherein each encrypted value is encrypted with a pseudorandom function key based on the pair of keywords and a secret master key.

14. The system of claim 13, wherein the pseudorandom function key is based on a concatenation of the pair of keywords.

15. The system of claim 12, wherein each encrypted tag is encrypted with a pseudorandom function key based on the one of the keywords and a secret master key.

16. The system of claim 12, wherein the encrypted search index further comprises, for each respective pair of keywords appearing in the one or more encrypted documents, a list of double tags, each double tag in the list of double tags comprising an encrypted hash of the corresponding encrypted tag for the respective pair of keywords.

17. The system of claim 16, wherein determining the second list of document identifiers comprises, for each remaining keyword appearing in the one or more encrypted documents after the first keyword and the second keyword:
 determining whether a double tag corresponding to the respective remaining keyword is present within the list of double tags; and
 removing from the list of double tags, each double tag that does not correspond to the respective remaining keyword.

18. The system of claim 12, wherein accessing the encrypted search index to obtain the first list of document identifiers comprises retrieving the keyword pair list of document identifiers that corresponds to the first keyword and the second keyword.

19. The system of claim 11, wherein the search query comprises:
 a token representative of the first keyword and the second keyword; and
 for each remaining keyword appearing in the one or more encrypted documents after the first keyword and the second keyword, a token representative of the first keyword and the respective remaining keyword.

20. The system of claim 11, wherein returning the second list of document identifiers obtained from the encrypted search index to the user device causes the user device to decrypt the second list of document identifiers using a secret master key.

* * * * *